Feb. 26, 1952 — N. W. KNEWSTUBB ET AL — 2,587,171
LAMINATED ARTICLE HAVING AN UNIMPREGNATED SURFACE
AND METHOD OF MAKING THE SAME
Filed Jan. 7, 1950
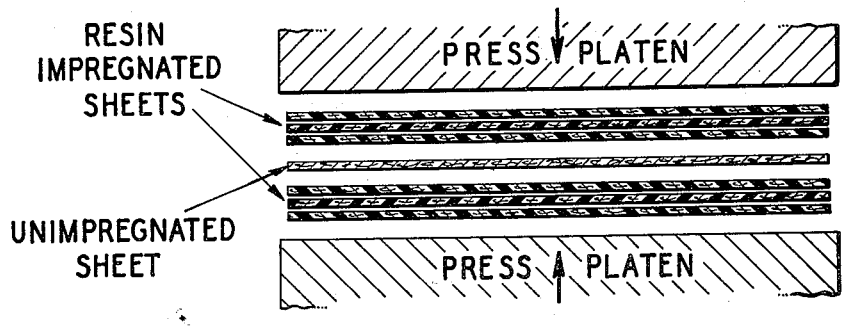
Fig. 1.
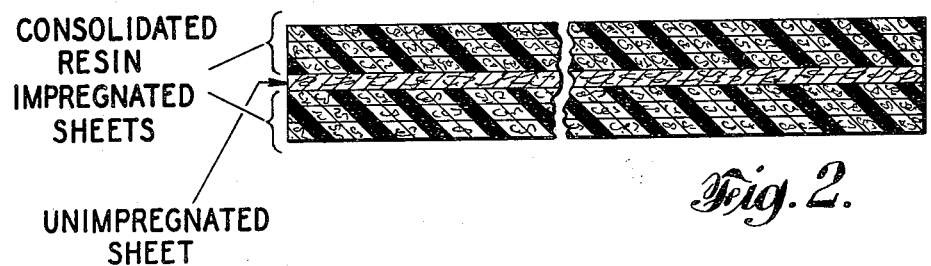
Fig. 2.
Fig. 3.
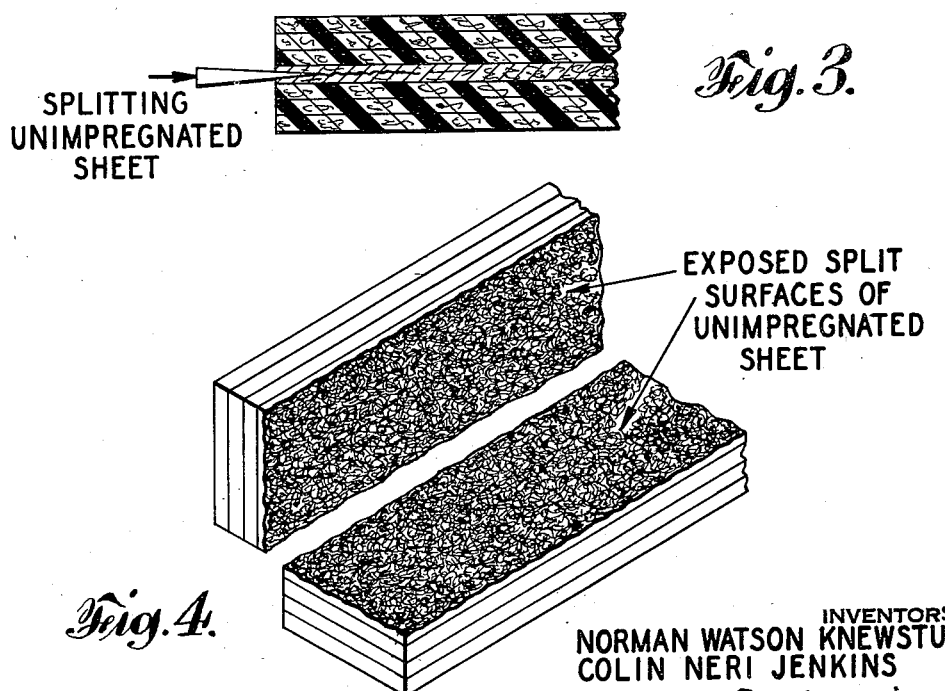
Fig. 4.
INVENTORS
NORMAN WATSON KNEWSTUBB
COLIN NERI JENKINS
BY D. C. Harrison
ATTORNEY Patented Feb. 26, 1952

2,587,171

UNITED STATES PATENT OFFICE 2,587,171

LAMINATED ARTICLE HAVING AN UNIMPREGNATED SURFACE AND METHOD OF MAKING THE SAME

Norman Watson Knewstubb, Solihull, Birmingham, and Colin Neri Jenkins, Yardley, Birmingham, England, assignors to Union Carbide and Carbon Corporation, New York, N. Y., a corporation of New York Application January 7, 1950, Serial No. 137,492
In Great Britain January 27, 1949

5 Claims. (Cl. 154—120)

This invention is for improvements in or relating to laminated sheets which comprise laminations of fibrous sheet material bonded with thermosetting synthetic resin and relates particularly to such laminated sheets having a surface or surfaces which are to be glued to other surfaces.

Laminated sheets are normally prepared by subjecting to heat and pressure a stack of fibrous layers impregnated with thermosetting synthetic resin. The surfaces of these molded sheets are hard and non-absorbent and are not suitable for subsequent gluing to a plywood or other core as in a veneering operation because the resulting bond is poor. The strength of the bond may be improved by sanding or otherwise roughening the surfaces to be united. There are, however, a number of disadvantages in such a treatment. Thus, a sanding operation is wasteful and is apt to introduce variations in thickness of the sheet with consequent variations in thickness of the glue layer and non-uniform bond strength throughout the sheet. Further, the variations in thickness may be transmitted to the decorative surface and are there visible as defects. Further, the decorative surface remote from the jointing surface may be damaged during the sanding process.

It is an object of the present invention to overcome the above-mentioned disadvantages and also to provide a simplified process of manufacture in which a laminated sheet, suitable for gluing to another surface or to other surfaces, is obtained without the necessity for subsequent surface treatment. The invention also provides a more uniform and efficient bond than that obtained by using a laminated sheet the surface of which has been mechanically roughened.

According to the present invention there is provided a process for the preparation of a laminated sheet one or both surfaces whereof are suitable for gluing to another surface or to other surfaces which process comprises superposing fibrous sheets impregnated or coated with thermosetting synthetic resin, interleaving at one or more places in the stack a single sheet of paper which has not been treated with synthetic resin, molding under heat and pressure, and subsequently splitting the resultant sheet in the plane or planes of the unimpregnated paper sheet or sheets.

The two surfaces exposed by each splitting operation are particularly suitable for gluing to other surfaces.

The single sheets of paper may be chosen from a wide range of papers but in general they should not be unduly thick since this leads to an unnecessary amount of paper on the surfaces formed by the splitting operation. A convenient thickness is 1 to 1½ mils. The paper should be sufficiently rough or porous to give adequate bonding to the laminated boards of which it is part, but if unduly porous the paper becomes impregnated and separation becomes difficult.

The thermosetting synthetic resins used for treating the fibrous sheets are preferably the condensation products of aldehydes such as formaldehyde with phenols, ureas or aminotriazines. The phenolic resins may be either of the resol type or of the novolak type and in the latter case they are used in conjunction with a hardener such as hexamethylenetetramine.

The fibrous sheets may consist for example of paper or textile materials formed from organic or inorganic fibres, or of wood veneers.

The invention includes the split laminated sheets made by the process above described and also the composite products formed by gluing a split laminated sheet or split laminated sheets to other surfaces, e. g. of wood or plywood.

The split laminated sheets may be secured to other surfaces by a wide range of glues both natural and synthetic. Examples of suitable glues include the thermosetting phenolic and amino resins, the acid hardening phenolic and amino resins, casein glue or rubber adhesives.

The conditions of pressing, the type and condition of synthetic resin and the type of paper are preferably selected and correlated as will be understood by those skilled in the laminating art so that no substantial impregnation of the interleaving unimpregnated paper occurs by passage of resin from contiguous sheets. The conditions which favor impregnation are high molding pressures, the use of resins of easy flowability and the selection of paper of high porosity.

In the accompanying drawing:

Fig. 1 shows in diagrammatic manner a laminating press charge or stack of individual resin impregnated fibrous sheets in which stack there is interposed an unimpregnated (resin free) fibrous sheet;

Fig. 2 illustrates in cross-section, the unitary laminated sheet formed by consolidating under heat and pressure in a laminating press, the stack of resin impregnated sheets and the unimpregnated sheet shown in Fig. 1;

Fig. 3 depicts diagrammatically the splitting of the laminated sheet in the plane of the unimpregnated sheet; and Fig. 4 shows a perspective view of the two split sections of the laminated sheet and the relatively rough adhesive-receptive exposed surfaces obtained by the splitting of the unimpregnated sheet.

Following is a description by way of example of methods of making a split laminated sheet and of uniting it as a veneer to plywood.

EXAMPLE I

This example describes the production of split laminated sheet comprising facing sheets and filler sheets produced in the following manner.

*Facing sheets*

Absorbent 5 mil cotton paper was impregnated with a pigmented alcoholic solution (60% by weight) of a phenol-formaldehyde resol made by condensing phenol with a molecular excess of aqueous formaldehyde in the presence of an alkaline catalyst. The impregnated sheet was dried for 10 minutes at 130° C. to a resin content of 60 to 70%.

*Filler sheets*

Absorbent 5 mil Kraft paper was impregnated with a non-pigmented alcoholic solution (40% by weight) of the phenol-formaldehyde resol employed for producing the pigmented resin solution used above. The impregnated sheet was dried for 5 minutes at 130° C. to a resin content of 40%.

The following laminations were assembled:

1 facing sheet prepared as described above
10 filler sheets prepared as described above
1 sheet of hard 1½ mil tissue paper
10 filler sheets as above
1 facing sheet as above This stack was placed between stainless steel plates and heated for 60 minutes at 160° C. while under a pressure of 2,000 lb./sq. in. to effect hardening of the resol. The resulting sheet was cooled for 30 minutes while still under pressure, removed from the press and split through the tissue paper layer to form two veneers the split surfaces of which are suitable for gluing to other surfaces.

EXAMPLE II

This example describes the production of split laminated sheet surfaced with wood veneer.

The following laminations were assembled:

(a) 1 facing sheet of 3 mil paper impregnated with heat-hardenable melamine-formaldehyde resin and dried for 14 minutes at 80° C. to a resin content of 60%.
(b) Rotary cut birch veneer (.015" thick) coated by spraying with heat-hardenable melamine-formaldehyde resin, dried for 3 hours at 40° C. to a resin content of 10–15%.
(c) 10 filler sheets prepared as described in Example I.
(d) 1 sheet of hard 1½ mil tissue paper.
(e) 10 filler sheets as (c).
(f) Birch veneer as (b).
(g) a paper as (a).

The stack was placed between stainless steel plates and heated for 60 minutes at 135° C. under a pressure of 2,000 lb./sq. in. to cure the resin binder. The resulting sheet was cooled for 30 minutes while still under pressure, removed from the press and split through the tissue paper layer to form two veneers the split surfaces of which are suitable for gluing to other surfaces.

EXAMPLE III

This example describes the veneering to plywood of the products of Example I or of Example II.

An acid accelerator for cold-setting urea-formaldehyde resin consisting of a 22% aqueous solution of ammonium chloride was rubbed into plywood in the proportion of 1 lb. accelerator per 100 sq. feet plywood and left at room temperature until dry to the touch (30 to 60 minutes). A cold-setting urea-formaldehyde liquid resin was then spread over the split face of a laminated sheet made as described in Example I or Example II using a mechanical glue spreader, spatula, or hard roller. About 3 lb. resin were spread over 100 sq. feet of sheet. The coated veneer was laid on the plywood and the assembly pressed for 8 to 10 hours at room temperature under a pressure of 100 lb./sq. in.

What is claimed is:

1. A process for the preparation of a laminated sheet which comprises superposing fibrous sheets impregnated with thermosetting synthetic resin, interleaving in at least one place in the stack a single sheet of rough, porous paper which has not been treated with synthetic resin, molding under heat and pressure, and subsequently splitting the resultant sheet in the plane or planes of the unimpregnated paper sheet.

2. A process as claimed in claim 1 wherein the single sheets of paper are 1 to 1½ mils thick tissue paper.

3. A process as claimed in claim 1 wherein the thermosetting synthetic resin used for impregnating or coating the fibrous sheets is a heat-hardenable condensation product of formaldehyde with a member selected from the group consisting of phenols, ureas and amino triazines.

4. A laminated article comprising a stack of heat-hardenable resin bonded fibrous sheets and at least one sheet of non-resin impregnated rough, porous paper interposed in said stack and bonded to the impregnated sheets by the resin in sheets contiguous thereto.

5. A laminated article comprising a stack of heat-hardenable resin bonded fibrous sheets and an outer split sheet of non-resin impregnated rough, porous paper bonded to the stack by resin from a contiguous bonded sheet.

NORMAN WATSON KNEWSTUBB.
COLIN NERI JENKINS.

REFERENCES CITED

The following references are of record in the file of this patent:

UNITED STATES PATENTS

| Number | Name | Date |
| --- | --- | --- |
| 312,451 | Ehret | Feb. 17, 1885 |
| 1,259,180 | White | Mar. 12, 1918 |
| 1,323,022 | Crowell et al. | Nov. 25, 1919 |
| 2,477,196 | Mohr | July 26, 1949 |